US008406082B2

(12) United States Patent
Michaels et al.

(10) Patent No.: US 8,406,082 B2
(45) Date of Patent: Mar. 26, 2013

(54) DETERMINING ENCLOSURE BREACH ULTRASONICALLY

(75) Inventors: Jennifer Michaels, Tucker, GA (US); Thomas Michaels, Tucker, GA (US); Gisele Bennett, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 176 days.

(21) Appl. No.: 12/523,622

(22) PCT Filed: Jan. 19, 2007

(86) PCT No.: PCT/US2007/001496
§ 371 (c)(1), (2), (4) Date: Jan. 13, 2010

(87) PCT Pub. No.: WO2008/088341
PCT Pub. Date: Jul. 24, 2008

(65) Prior Publication Data

US 2010/0195446 A1 Aug. 5, 2010

(51) Int. Cl.
*G01S 15/00* (2006.01)

(52) U.S. Cl. .......................................................... 367/96

(58) Field of Classification Search .................. 367/135, 367/136
See application file for complete search history.

(56) References Cited

U.S. PATENT DOCUMENTS 4,319,349 A * 3/1982 Hackett .......................... 367/94
4,975,891 A * 12/1990 Wineland et al. ............ 367/136
5,305,239 A * 4/1994 Kinra .............................. 702/39
5,513,528 A * 5/1996 Holenka et al. ........... 73/152.03
5,615,794 A * 4/1997 Murray, Jr. .................... 220/304
6,122,312 A * 9/2000 Shiro ........................... 375/147
6,292,432 B1 * 9/2001 Futsuhara et al. .............. 367/96
6,297,747 B1 * 10/2001 Magori et al. ........... 340/870.28
7,233,243 B2 * 6/2007 Roche et al. .................. 340/540
2002/0027831 A1 * 3/2002 Futsuhara et al. .............. 367/96
2003/0057366 A1 * 3/2003 Gzara et al. ................ 250/269.3
2003/0164820 A1 * 9/2003 Kent ............................ 345/177
2005/0047277 A1 * 3/2005 Chamberlain et al. ........ 367/136
2005/0134440 A1 6/2005 Breed
2005/0248456 A1 11/2005 Britton, Jr. et al.
2005/0251342 A1 * 11/2005 Market et al. ..................... 702/6
2005/0274168 A1 * 12/2005 Stuetzler ...................... 73/12.01
2006/0081071 A1 * 4/2006 Kessler et al. ........... 73/862.391
2006/0241510 A1 10/2006 Halperin et al.

OTHER PUBLICATIONS

Jain et al. "Modeling and Simulation for Emergency Response: Workshop Report, Standards and Tools." U.S. Department of Commerce, Dec. 2003, pp. 1-30 and appendices.

* cited by examiner

*Primary Examiner* — Isam Alsomiri
*Assistant Examiner* — James Hulka
(74) *Attorney, Agent, or Firm* — Merchant & Gould

(57) ABSTRACT

A structure intrusion may be determined. For example, a signal may be received corresponding to a wave propagating in the structure. Next, the received signal may be analyzed. Based on the analysis in a "passive mode", a breach may be determined to have occurred in the structure when the received signal indicates that at least one aspect of the received signal crosses a predetermined threshold. Furthermore, based on the analysis in an "active mode", a breach may be determined to have occurred in the structure when comparing the received signal to a baseline waveform indicates that at least one aspect of the received signal varies from the baseline waveform by a predetermined amount. The wave propagating in the structure may comprise an elastic wave and may be in an acoustic frequency range or in an ultrasonic frequency range.

8 Claims, 20 Drawing Sheets

1800

DETERMINING ENCLOSURE BREACH ULTRASONICALLY

RELATED APPLICATIONS

Related U.S. patent application Ser. No. 12/523,611, filed on even date herewith in the name of Georgia Tech Research Corporation et al. and entitled "ENCLOSURE DOOR STATUS DETECTION," related U.S. patent application Ser. No. 12/523,614, filed on even date herewith in the name of Georgia Tech Research Corporation et al. and entitled "DETERMINING ENCLOSURE BREACH ELECTROMECHANICALLY," each being assigned to the assignee of the present application, are hereby incorporated by reference.

BACKGROUND

Threats due to terrorism come in many forms. In some situations, containers carrying goods into a country may be tampered with or contain unauthorized or harmful material. For example, a container carrying commercial goods from one country to another may be tampered with during transportation to insert harmful material. Vulnerability to tampering is a shortcoming in conventional container security devices. Current container security technologies provide only limited protection from various threats to shipping. Particularly, conventional container security devices fail to account for the threat posed by motivated actors, including, for example, terrorist groups. For example, conventional strategies do not address a broad risk spectrum with a focus on those risks that threaten national security. Moreover, conventional strategies do not provide a number of tamper-resistant features incorporated into one design. In other words, conventional strategies do not address vulnerability to even simplistic tampering methods.

SUMMARY OF THE INVENTION

Consistent with embodiments of the present invention, systems and methods are disclosed for determining structure intrusions. For example, a signal may be received corresponding to a wave propagating in the structure. Next, the received signal may be analyzed. Based on the analysis in a "passive mode", a breach may be determined to have occurred in the structure when the received signal indicates that at least one aspect of the received signal crosses a predetermined threshold. Furthermore, based on the analysis in an "active mode", a breach may be determined to have occurred in the structure when comparing the received signal to a baseline waveform indicates that at least one aspect of the received signal varies from the baseline waveform by a predetermined amount.

It is to be understood that both the foregoing general description and the following detailed description are examples and explanatory only, and should not be considered to restrict the invention's scope, as described and claimed. Further, features and/or variations may be provided in addition to those set forth herein. For example, embodiments of the invention may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
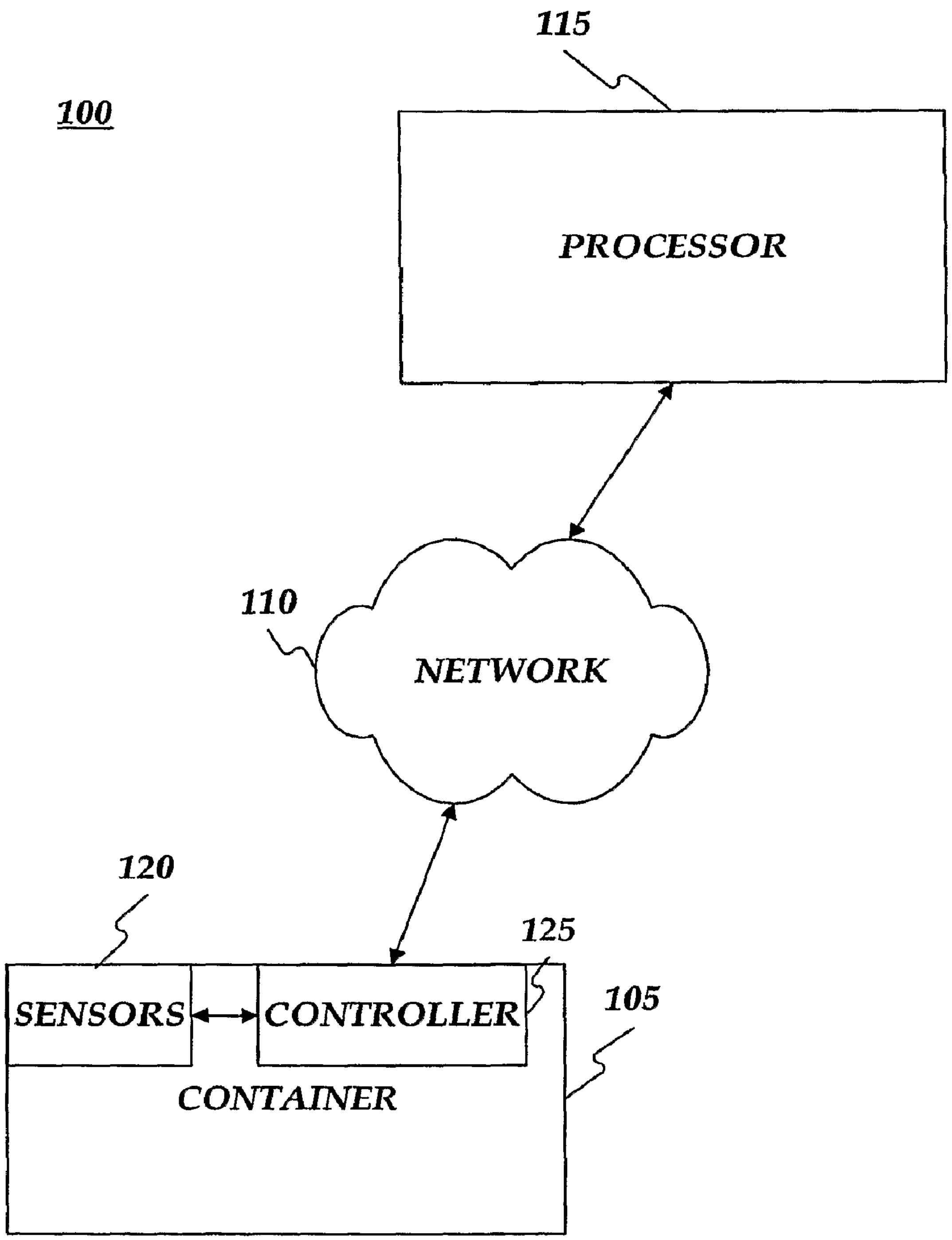
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the invention's proper scope is defined by the appended claims.

Enclosure intrusions and other enclosure information may be determined consistent with embodiments of the present invention. For example, a multi-modal sensing device may be provided to secure containers (e.g. shipping containers) against various threats. These threats may comprise, but are not limited to, structural breaches, a locked door opening, and human presence. Moreover, embodiments of the invention may incorporate an integrated design including multiple sensing modalities, sensor fusion algorithms, and associated packaging. Embodiments of the invention may be performed by any one or more subsystems that are described in more detail below.

By way of a non-limiting example, FIG. 1 illustrates a security system 100 in which features and principles of the present invention may be implemented. As illustrated in the block diagram of FIG. 1, system 100 may include a container 105, a network 110, and a processor 115. Container 105 may include sensors 120. A controller 125 may also be included in container 105 to coordinate communications between sensors 120 and processor 115.

Figure 2:
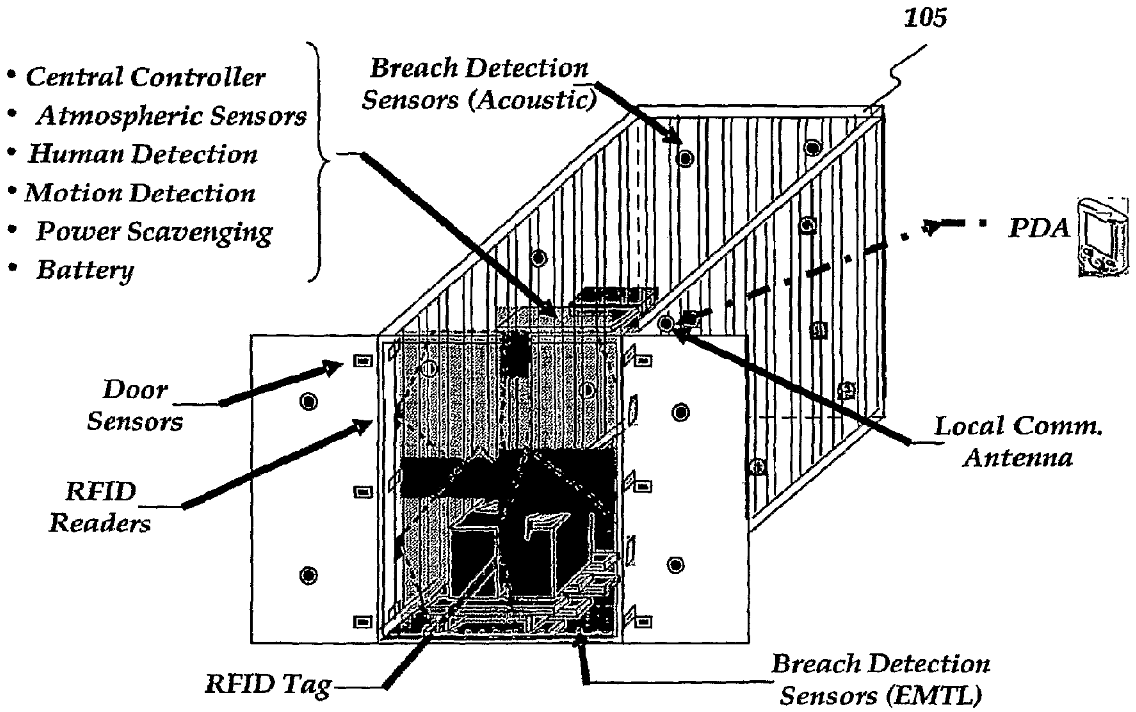
FIG. 2 is a diagram illustrating a container.

Processor 115 may be monitored or operated by a user, for example, desiring to implement container security. Furthermore, the user may also be an organization, enterprise, or any other entity having such desires. Container 105 may comprise, but is not limited to, a shipping container configured to be used for transporting goods from one location to another. For example, container 105 may be filled with goods, secured, and placed upon a ship, airplane, or truck to be transported. While container 105 may comprise a shipping container, it may comprise, for example, any enclosure for which location, movement, security, structural breaches, door position status, or human presence may be monitored. As will be described in greater detail below, data gathered by sensors 120 may be sent to processor 115 over network 110. While system 100 illustrates only one container 105, a plurality of containers my be monitored by processor 115. FIG. 2 shows container 105 in more detail.

Consistent with embodiments of the invention, system 100 may provide container security with multiple sensing modalities, condition monitoring, and advanced alerting capabilities. System 100 may incorporate a number of sensors 120 as well as sensor fusion technologies that may address a variety of threats to the container. Specific threats that may be detected include, for example, container 105 structure breaches, presence of unauthorized occupants (e.g. humans) in container 105, container 105 door opening, and environmental conditions associated with container 105. In addition, container 105's movement may be monitored along with the temperature and humidity inside container 105. Information collected by sensors 120 may be processed by processor 115. Processor 115 or controller 125 may determine whether a security violation has occurred with container 105 and issues an alert.

Various communications interfaces may be used to provide remote access in system 100. A local communications interface (e.g. located in controller 125) may provide wireless communication between processor 115 and sensors 120 within 50 meters of container 105 using, for example, the IEEE 802.15.4 protocol. This protocol may be sufficiently robust to enable, for example, 50 meter transmission distances even when a transmitter associated with any of sensors 120 is surrounded by other containers that may obstruct radio transmissions using other protocols. The local communications interface may enable users with handheld computing devices (e.g. personal digital assistants (PDA)) to query container 105 or receive security alerts from container 105. Long distance communication may be accomplished between processor 115 and sensors 120 via an RS-485 interface (e.g. located in controller 125) to a marine asset tagging and tracking system (MATTS). A physical interface (e.g. a cable) may also be provided between processor 115 and controller 125 associated with sensors 120 to allow firmware upgrades to be loaded directly onto controller 125.

Consistent with embodiments of the invention, container 105 breach detection may be accomplished, for example, via ultrasonic sensors and electromagnetic sensors included in sensors 120. These sensors may detect changes in the container structure. The ultrasonic sensors may be installed as a sparse array mounted to container 105's walls. The ultrasonic sensors may operate passively or actively. For example, the ultrasonic sensors may operate passively by listening for elastic waves in container 105's walls that may indicate an attempt to cut into the container. For passive operation, one or more sensors on each wall may be used as ultrasonic receivers to detect signals corresponding to "ultrasonic events" (e.g. elastic waves in container 105's walls.) The nature of these signals in the time-domain, the frequency domain, or the time-frequency domain may be used to separate noise signals generated by breaches from non-breaching noise events. In the time-frequency domain, for example, a wavelet transform, a chirplet transform, or other similar transforms may be used.

Moreover, the ultrasonic sensors may operate actively by transmitting a signal (e.g. a pulse elastic wave) into the wall and then comparing the response due to the transmitted signal with a response from previously transmitted signals. Furthermore, the signal may be transmitted in the floor, roof, or in any other part of container 105 in which the signal may be transmitted and is not limited to the walls. Changes in the ultrasonic response to container 105's walls, for example, may indicate a new breach and may generate an alarm by processor 115 or controller 125. In other words, active operation may involve transmitting and receiving signals comprising ultrasonic waves in container 105's walls using various sensor (i.e. transducer) pairs that may be attached to the wall. Ultrasonic elastic waves are examples and the signals propagated into the walls may comprise other signal types. One transducer may be operated as a transmitter and another one as a receiver.

The ultrasonic waves generated by the transmitter may be recorded by the receiver. This process may be repeated for multiple transmit/receive transducer combinations. For each transmit/receive event, ultrasonic waves propagate throughout container 105's walls and interact with boundaries, natural structural variations, and breaches. Received ultrasonic wave signals may contain information about the material/structure between and in the vicinity of the particular transmit/receive transducer pair used for the active ultrasonic measurement. In the active mode, received ultrasonic waveforms may be analyzed and compared to baseline waveforms (e.g. waveforms recorded before a breach existed.) Features computed from both passive and active ultrasonic signals may be computed and analyzed, for example, by processor 115 or controller 125 as a function of time to detect and characterize potential breaches.

All sensors 120 may be integrated into a single monitoring system. As described in greater detail below, data fusion algorithms may be used to detect, locate, and estimate the severity of a breach or potential breach. The combination of the passive and active ultrasonic monitoring processes may provide a robust detection method for breach detection. Although shipping containers may be referenced above, embodiments of the invention may be applied to any enclosure.

To detect breaches in portions of container 105 made of a material for which the aforementioned ultrasonic sensors may not be able to detect a breach, electromagnetic sensors may be used. For example, container 105's floor may be wooden or any material not as well suited for the aforementioned ultrasonic sensors. Consequently, the aforementioned ultrasonic sensors may not be able to detect a breach in container 105's floor. The electromagnetic sensors, for example, may each comprise paired transmission lines that may be placed in container 105's floor. A radio frequency (RF) signal with a known frequency may be applied to these paired transmission lines in order to generate a standing wave pattern. As described in greater detail below, the standing wave pattern can be monitored by controller 125 or processor 115 to detect floor breaches in container 105. Furthermore, the frequency used by the electromagnetic sensors may be generated pseudo-randomly that may make the sensor difficult to tamper.

A breach may be defined, for example, as any intrusion attempt that produces a hole nine square inches or larger in area through a side of a container. Moreover, breaches may be detected with a detection probability greater than 75% and within two minutes of occurrence. Any corresponding false alarm rate may be less than 0.003 false alarms per container trip. Any of sensors 120 may be suitable for installation in both new containers and used containers in less than two hours in order to accommodate widespread deployment. Because of the unique threats posed to the floor, a sensor used for the floor may be insensitive to nails driven through the floor for securing cargo, floor damage associated with normal use, and cargo loading conditions. The maritime environment may require that the sensor be insensitive to both humidity in the container and floor moisture content.

Consistent with embodiments of the invention, electromagnetic sensors (i.e. electromagnetic transmission line (EMTL) sensors) may comprise a grid of parallel conductive strips that are installed on the floor between two plywood sections in order to form an electromagnetic transmission line. The spacing of the conductors and the construction of the grid may be such that driving nails through the floor and other damage associated with normal use may not significantly alter (either by breaking or shorting) conductors in the grid. However, cutting a hole with an area (e.g. greater than nine square inches) may break the grid and thus change the transmission line's characteristics.

These changes in the transmission line's characteristics may be detected by measuring the voltage standing wave pattern on the transmission line. A standing wave pattern may be induced on a transmission line when the transmission line is driven at a constant frequency. Reflections may occur at the line termination. This pattern may be characterized by the location of the maximum and minimum voltage points, the separation between those points, and the ratio of the maximum to minimum voltage values, that is referred to as the voltage standing wave ratio (VSWR). These transmission line characteristics may be measured by sensing the voltage on the line at several locations along the grid at several different input frequencies. These frequencies may be applied as short RF bursts in the frequency range, for example, from 1 MHz to 50 MHz. The duty cycle for the signal generation may be estimated to be less than 0.001% to meet a 2 minute breach detection goal. The aforementioned EMTL process may be effective for detecting breaches while unaffected by either nailing through, for example, the floor or cargo loading effects. Furthermore, sensor operation may be maintained after both shorting or breaking grid lines. Although developed for shipping containers, this concept may be applied as a process for detecting penetration of other enclosures.

Sensors 120 may also include carbon dioxide ($CO_2$) presence sensors. For example, human presence may be detected using the $CO_2$ sensor. The $CO_2$ concentration in container 105, for example, may increase in a closed system such as container 105 when a human is present. The $CO_2$ sensor may comprise two light emitting diodes (LEDs), one LED may emit light in a small spectral region where $CO_2$ displays strong absorption and the other LED may emit light in spectral region where $CO_2$ displays no absorption. By pulsing these LEDs in sequence and monitoring the light transmission through a cavity that contains an air sample from container 105, the $CO_2$ concentration in container 105 may be calculated. Because the rate at which carbon dioxide concentration increases with human presence may be pre-established, comparing $CO_2$ concentrations from container 105 with these pre-established measurements may indicate whether a human is present in container 105.

Furthermore, sensors 120 may also include an open door sensor. The container door status may be monitored using optical sensors that may comprise two parts: an LED light source; and a paired photodetector that may be sensitive to light from the LED light source. One part may be installed inside container 105 on a wall and the other part may be installed on container 105's door panel. The two parts may operate such that the light from the LED light source may be incident on the photodetector when the door is closed. A light control film may be used to limit the photodetector's field of view so that small changes in the door position can be detected.

A door opening event may be detected when the change in light level at the photodetector exceeds a threshold value. In other words, if container 105's door were to open a small amount, no door opening event may be detected. However, if container 105's door were to open so much as to change the light level at the photodetector to exceed the threshold value, a door opening event may be detected. For example, small changes in the door's location may not indicate that the door is being opened. If, however, the door were to move by a larger amount, this may indicate that the door is being opened. In the shipping container example, containers may be stacked, that in turn, may cause the doors on some containers to bulge open a small amount. Because this bulging may be a common occurrence and may not indicate tampering, a door opening event may not be indicated by door bulging due to stacking. Moreover, using randomly generated pulse codes between the LED light source and the paired photodetector to interrogate the open door sensor may make it more difficult to tamper. These codes may be generated pseudorandomly so that the transmitter and receiver may synchronize without a cabled connection between them.

As stated above, the door sensor may comprise two parts (i.e. two modules). One part may include an LED that emits light of wavelength 950 nm in a narrow beam with a divergence of less than 10 degrees. The other part may include a low profile silicon photodetector with a sheet of light control film covering the detector. The light control film may comprise, but is not limited to, a modified implementation of the embedded-micro-louver transparent plastic sheets used, for example, to cover computer display terminals and provide privacy in public environments.

For the door sensor application, the aforementioned film may be fabricated such that it may restrict light transmission to an angle less than 10 degrees. The two door sensor modules may be installed so that, when the door is closed, light from the LED may be incident upon and detected by the photodetector. For example, as the door is opened, the interior angle increases. Consequently, the light amount detected decreases as the light beam rotates out of the detector's field of view which may be defined by the light control film. A detection threshold for the photodetector may be used to define when the door is considered opened. Furthermore, instead of continuous illumination, the light from the LED may be pulsed using a pulse interval modulation signaling scheme. This may prevent active falsification of the LED source's signature for the purposes of generating a false "door closed" status.

Moreover, sensors 120 may also include a movement sensor. Container 105's movement sensor may comprise, for example, a dual-axis, low power accelerometer. The accelerometer may senses changes in velocity along each axis. This velocity change data may then be integrated in order to find container 105's velocity. For example, a non-zero velocity may indicate that container 105 is in motion. Furthermore, sensors 120 may also include sensors to monitor environmental conditions inside container 105 such as temperature and humidity.

Data from sensors 120 may be transmitted to controller 125 that may in turn process and transmit the data over network 110 to processor 115. Processor 115 may process the data prior to making a decision to issue a security alert. In another embodiment, controller 125 may process the data prior to making a decision to issue a security alert and pass any alerts to processor 115. This integrated approach to detecting security threats may improve a high security threat detection probability to container 105 while minimizing false alarms risks. Moreover, techniques to improve sensor 120's tamper-resistance may be incorporated into sensors 120 as well as into controller 125. In addition, system 100 may interface to other sensors that can provide utility to shippers. These other sensors may comprise, but are not limited to, radio frequency identification (RFID) tag readers. The ability to read RFID tags on goods or other elements as they enter or exit container 105 may comprise a significant asset. For example, controller 125 or processor 115 may monitor and record all goods or other elements that have entered and exited container 105.

An embodiment consistent with the invention may comprise a system for determining enclosure intrusions and other enclosure information. The system may comprise a memory storage and a processing unit coupled to the memory storage. The processing unit may be operative to receive data from a plurality of sensors associated with the enclosure wherein at least one of the plurality of sensors comprises at least one of the following sensor types: ultrasonic, acoustic, electromagnetic transmission line (EMTL), container movement, human detection, and door status. Furthermore, the processing unit may be operative to analyze the data to determine if an enclosure intrusion event has occurred. In addition, the processing unit may be operative to issue an alert when it is determined that the intrusion event has occurred.

Consistent with an embodiment of the present invention, the aforementioned memory, processing unit, and other components may be implemented in a security system, such exemplary security system 100 of FIGS. 1 and 2. Any suitable combination of hardware, software, and/or firmware may be used to implement the memory, processing unit, or other components. By way of example, the memory, processing unit, or other components may be implemented with any of processor 115 or controller 125, in combination with system 100. The aforementioned system, processor, and controller are exemplary and other systems, processors, and controllers may comprise the aforementioned memory, processing unit, or other components, consistent with embodiments of the present invention.

Figure 3:
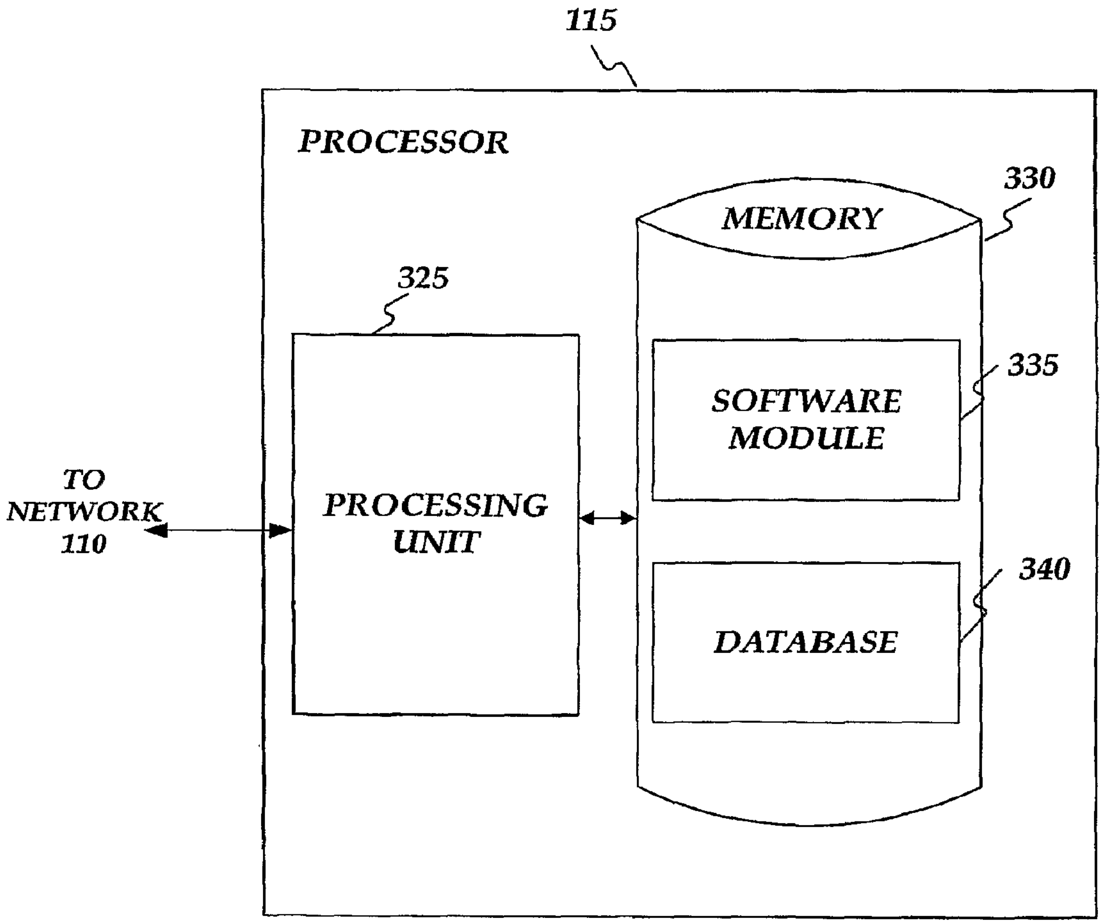
FIG. 3 is a block diagram of a processor.

FIG. 3 shows processor 115 of FIG. 1 in more detail. As shown in FIG. 3, processor 115 may include a processing unit 325 and a memory 330. Memory 330 may include a software module 335 and a database 340. While executing on processing unit 325, software module 335 may perform security processes, including, for example, one or more of the stages of method 400 described below with respect to FIG. 4. Furthermore, any combination of software module 335 and database 340 may also be executed on or reside in controller 125 as shown in FIG. 1. Controller 125 may comprise a configuration similar to processor 115.

Processor 115 or controller 125 ("the processors") included in system 100 may be implemented using a personal computer, network computer, mainframe, or other similar microcomputer-based workstation. The processors may though comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processors may comprise other systems or devices.

Network 110 may comprise, for example, a local area network (LAN) or a wide area network (WAN). Such networking environments may be used in offices, enterprise-wide computer networks, intranets, and the Internet. When a LAN is used as network 110, a network interface located at any of the processors may be used to interconnect any of the processors. When network 110 is implemented in a WAN networking environment, such as the Internet, the processors may typically include an internal or external modem (not shown) or other elements for establishing communications over the WAN. Further, in utilizing network 110, data sent over network 110 may be encrypted to insure data security by using encryption/decryption techniques.

In addition to utilizing a wire line communications system as network 110, a wireless communications system, or a combination of wire line and wireless may be utilized as network 110 in order to, for example, exchange web pages via the Internet, exchange e-mails via the Internet, or for utilizing other communications channels. Wireless can be defined as radio transmission via the airwaves. However, various other communication techniques can be used to provide wireless transmission, including infrared line-of-sight, cellular, microwave, satellite, packet radio, and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission. For example, the processors may communicate across a wireless interface such as, for example, a cellular interface (e.g. general packet radio system (GPRS), enhanced data rates for global evolution (EDGE), global system for mobile communications (GSM)), a wireless local area network interface (e.g., WLAN, IEEE 802, WiFi, WiMax), a bluetooth interface, another RF communication interface, and/or an optical interface.

System 100 may also transmit data by methods and processes other than, or in combination with, network 110. These methods and processes may include, but are not limited to, transferring data via, diskette, flash memory sticks, CD/DVD ROM, facsimile, conventional mail, an interactive voice response system (IVR), or via voice over a publicly switched telephone network.

Figure 4:
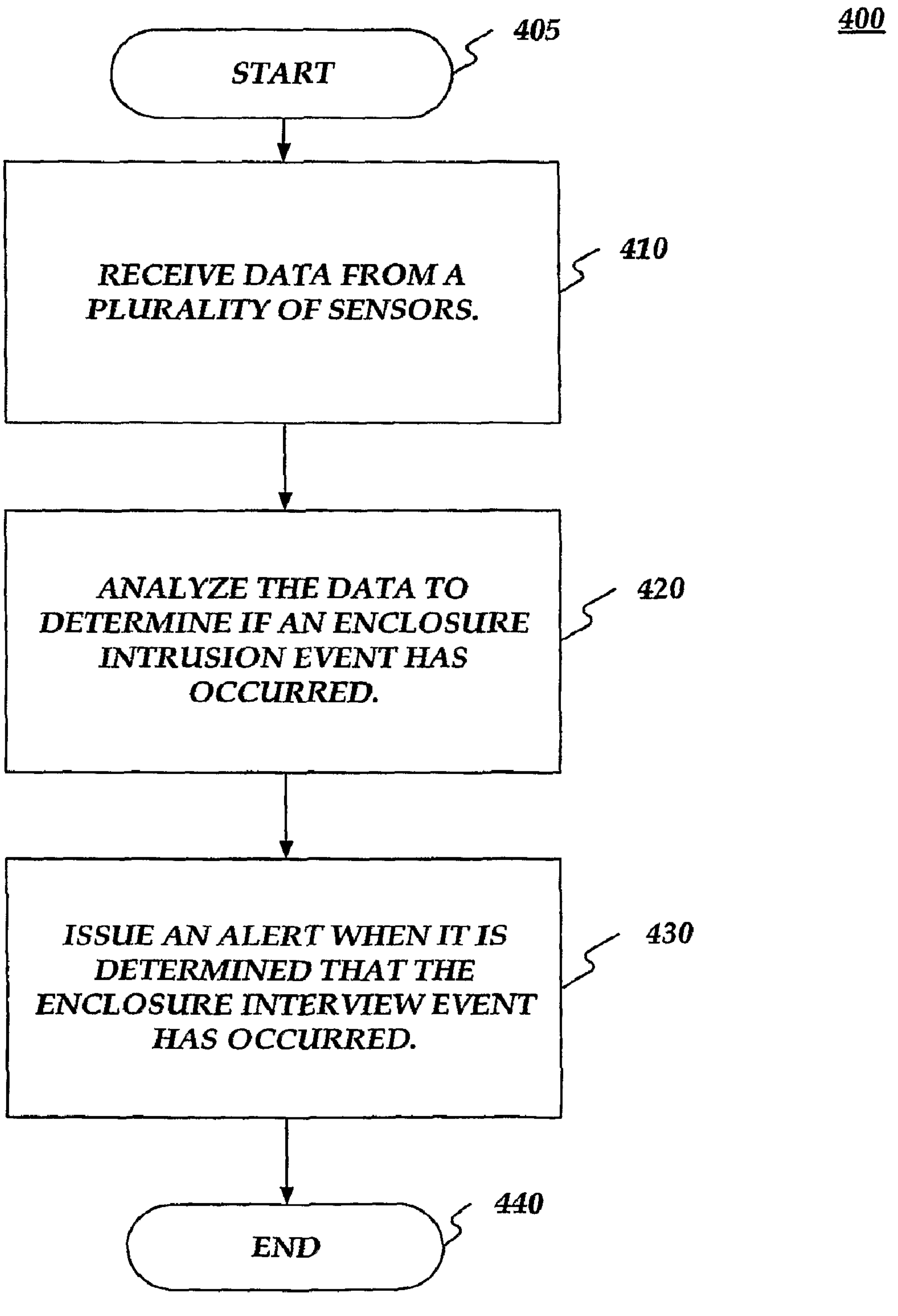
FIG. 4 is a flow chart of a method for determining enclosure intrusions and other enclosure information.

FIG. 4 is a flow chart setting forth the general stages involved in a method 400 consistent with an embodiment of the invention for determining enclosure intrusions and other enclosure information. Method 400 may be implemented using processor 115 or controller 125 as described in more detail below with respect to FIG. 1. Ways to implement the stages of method 400 will be described in greater detail below. Method 400 may begin at starting block 405 and proceed to stage 410 where controller 125 may receive data from plurality of sensors 120 located within an enclosure (e.g. container 105.) For example, at least one of the plurality of sensors may comprise at least one of the following sensor types: ultrasonic, acoustic, electromagnetic transmission line (EMTL), container movement, human detection, and door status, as described, for example, in more detail below.

From stage 410, where controller 125 receive the data from plurality of sensors 120 located within the enclosure, method 400 may advance to stage 420 where controller 125 may analyze the data to determine if an enclosure intrusion event has occurred. For example, analyzing the data may include determining if the enclosure intrusion event comprises at least one of the following: the enclosure has been breached, any one of the plurality of sensors has been tampered, and the presence of a human has been detected in the enclosure. Furthermore, sensor fusion may be used, as described in more detail below, to analyze the data.

Once controller 125 analyzes the data to determine if the enclosure intrusion event has occurred in stage 420, method 400 may continue to stage 430 where controller 125 may issue an alert when it is determined that the intrusion event has occurred. For example, issuing the alert may comprise issuing the alert indicating that contents of the enclosure and location of the enclosure. The contents of the enclosure may be determined from radio frequency identification (MD) tags placed on the contents of the enclosure. Moreover, the location of the enclosure may be determined by a movement sensor located in the enclosure as described below. After controller 125 issues the alert in stage 430, method 400 may then end at stage 440.

Ultrasonic Breach Detection

Ultrasonic sensors within sensors 120 may be operated as an ultrasonic breach detection subsystem. The ultrasonic breach detection subsystem may comprise, as referenced above, active, passive, and/or a combination of active and passive ultrasonics using the same ultrasonic sensors set. Multiple ultrasonic sensors may be mounted on each container surface. In the passive mode, each sensor may independently monitor, for example, ultrasonic signals between approximately 50 kHz and 500 kHz. These signals may be analyzed by controller 125 or processor 115, for example, in the frequency domain in terms of ratios of energies in different frequency bands. Each of these ratios, for example, may be referred to as a feature, and may be defined as follows:

$$\text{Feature}(f_1, f_2, f_3, f_4) = 10\log_{10}\left[\frac{\int_{f_1}^{f_2} X^2(f)\,df}{\int_{f_3}^{f_4} X^2(f)\,df}\right]$$

Here $f_1$, $f_2$, $f_3$ and $f_4$ may delineate the frequency ranges of interest. Multiple features can be fused in order to discriminate breaching sounds from benign (i.e. non-breaching) sounds. In addition, these signals may be analyzed by controller 125 or processor 115 in, for example, the time or the time-frequency domain.

In the active mode, ultrasonic sensors may operate, for example, in transmit-receive pairs where the received signal interrogates the container surface for evidence of a breach. Signals may be compared to baselines, both fixed and adaptive, to detect changes that may be indicative of a breach. These signals, for example, may be analyzed by controller 125 or processor 115 in the frequency, time, or the time-frequency domain in the active mode. In the time domain, the local temporal coherence (also referred to as the local normalized cross correlation) may be one measure of change that is sensitive to changes in wave shape but not arrival times; it may be given in the equations below:

$$R_{xy}^T(\tau, t) = \frac{1}{T}\int_{t-\frac{T}{2}}^{t+\frac{T}{2}} x(s)w(s-t)y(s+\tau)w(s+\tau-t)\,ds$$

$$\gamma_{xy}^T(\tau, t) = \frac{R_{xy}^T(\tau, t)}{\sqrt{R_{xx}^T(0, t)R_{yy}^T(0, t)}}$$

$$= \text{Local Temporal Coherence}$$

$$C_{xy}(t) = \max_{\tau}|\gamma_{xy}^T(\tau, t)|$$

$$= \text{Peak Coherence}$$

$$P = \overline{1 - C_{xy}(t)}$$

Here the parameter P, which may be calculated from the local temporal coherence, may be used to evaluate changes between two signals and thus may detect a breach.

Figure 5:
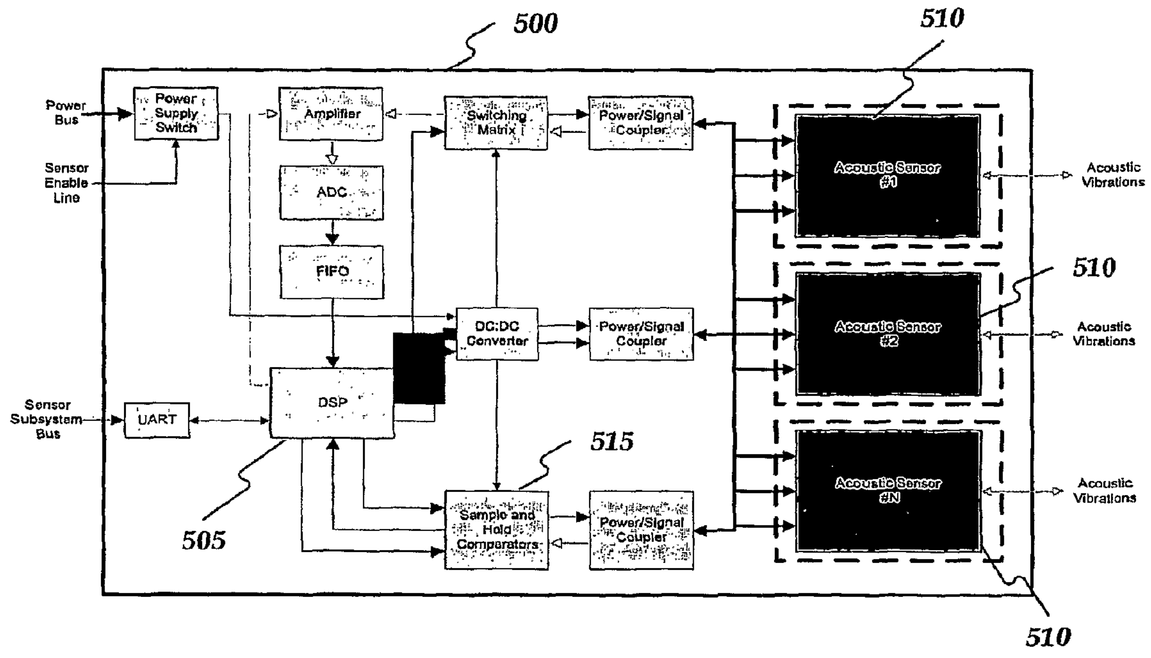
FIG. 5 is a diagram illustrating an ultrasonic breach detection subsystem.

An ultrasonic breach detection subsystem 500, shown in FIG. 5, comprises a digital signal processing (DSP) controller 505, an acquisition path for acquiring passive ultrasonic data, an acquisition path for acquiring active ultrasonic data, and communication links with controller 125. Ultrasonic breach detection subsystem 500 may have three operation modes to reduce power consumption: (1) a sleep mode where the entire subsystem may be placed in a near zero power state; (2) a minimal power state where only the passive ultrasonic functions may be operational; and (3) a higher power state during active ultrasonic interrogations. Ultrasonic breach detection subsystem 500 may be located on a printed circuit board in a main electronics enclosure except for ultrasonic sensors 510 shown in greater detail in FIG. 6. Each of ultrasonic sensors 510 may comprise an active piezoelectric element 605 combined with sensor electronic components that may be integrated into a small molded case. The sensor electronic components may include a miniaturized pulser and a receive amplifier 615 for both passive and active operation. The design may incorporate sending power and signals over three lines that are shown interfaced to ultrasonic sensor 510 in FIG. 6.

Figure 6:
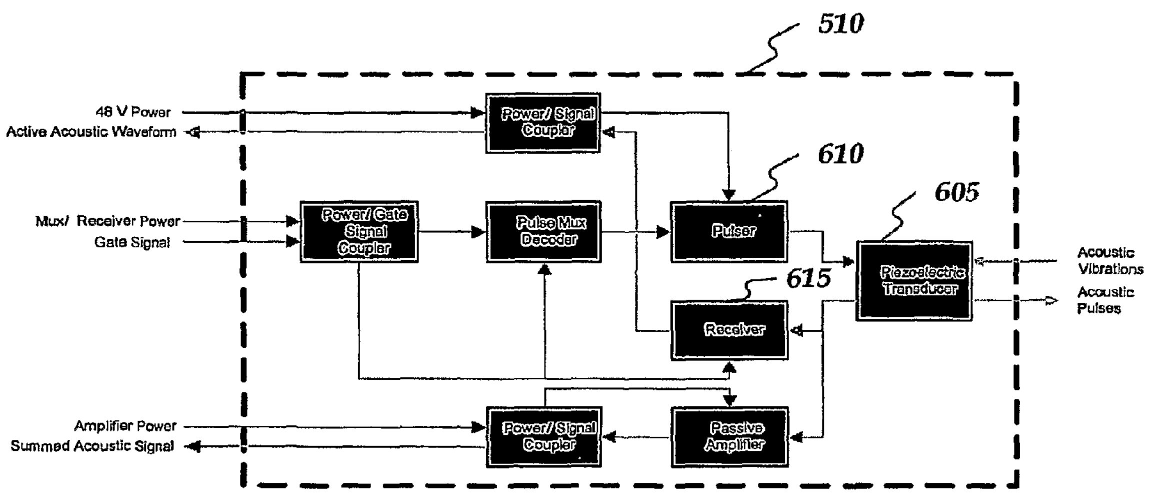
FIG. 6 is a diagram illustrating an ultrasonic sensor.

For passive operation, power may be provided to the lower left line in FIG. 6 to energize only the passive receive amplifier, for example. Passive ultrasonic signals may be transmitted back to a bank of frequency filters/sample and hold comparators 515 on ultrasonic breach detection subsystem 500 shown in FIG. 5. As an option, DSP 505 may next energize the other two lines to the left of FIG. 6 and use the active ultrasonic data path to digitize passive ultrasonic signals should more complex signal features be required.

For active operation, power may be blocked to the passive ultrasonic electronics (lower line to left of FIG. 6) and supplied to the two lines (upper two lines to left of FIG. 6) that may energize and provide control signals to the active ultrasonic pulser 610 and receiver 615. The active electronics circuitry for each sensor 510 may be configured, for example, as either a pulser only, pulser/receiver, or receiver only. For normal active ultrasonic operation, each sensor 510 may be configured as either a pulser or a receiver. The pulser/receiver (pulse/echo) mode of operation may be retained to assist with sensor subsystem diagnostics and possible use of the system in a degraded mode of operation with only one sensor.

Consistent with embodiments of the invention, between 4 and 8 ultrasonic sensors may be integrated together in prefabricated, molded cable assemblies, with transducer and electronic elements packaged as molded "button" shaped elements at cable branch and sensor attachments points. The cables may be enclosed in a rubber sheathed armored cable harness.

Electromagnetic Breach Detection

The aforementioned ultrasonic breach detection may not be effective on container floors that are made of, for example, non-metal such as plywood because ultrasonic waves may not propagate well in non-metal (e.g. wooden) material. In addition, the floor may be subject to additional normal and abnormal threats, such as penetrations from nails used to secure cargo that do not occur on other surfaces such as the walls or roof. As a result, consistent with embodiments of the invention, an electromagnetic transmission line (EMTL) process may be used on container 105's floor. The EMTL process may be used on any material in which ultrasonic waves may not propagate well.

Consistent with embodiments of the invention, breaches greater than nine square inches in area may be detected with a probability of detection greater than 82% and within two minutes of occurrence. The corresponding false alarm rate may be less than 0.003 false alarms per trip. The EMTL sensor may be suitable for installation in both new containers and used containers in less than two hours in order to, for example, accommodate widespread deployment. Because of the unique threats posed to the floor, the EMTL sensor may be made insensitive to nails driven through the floor for securing cargo, floor damage associated with normal use, and cargo loading conditions. The maritime environment may require that the sensor be insensitive to both humidity in the container and the moisture content of the floor. Overall average power consumption may be less than 70 mW.

Figure 7:
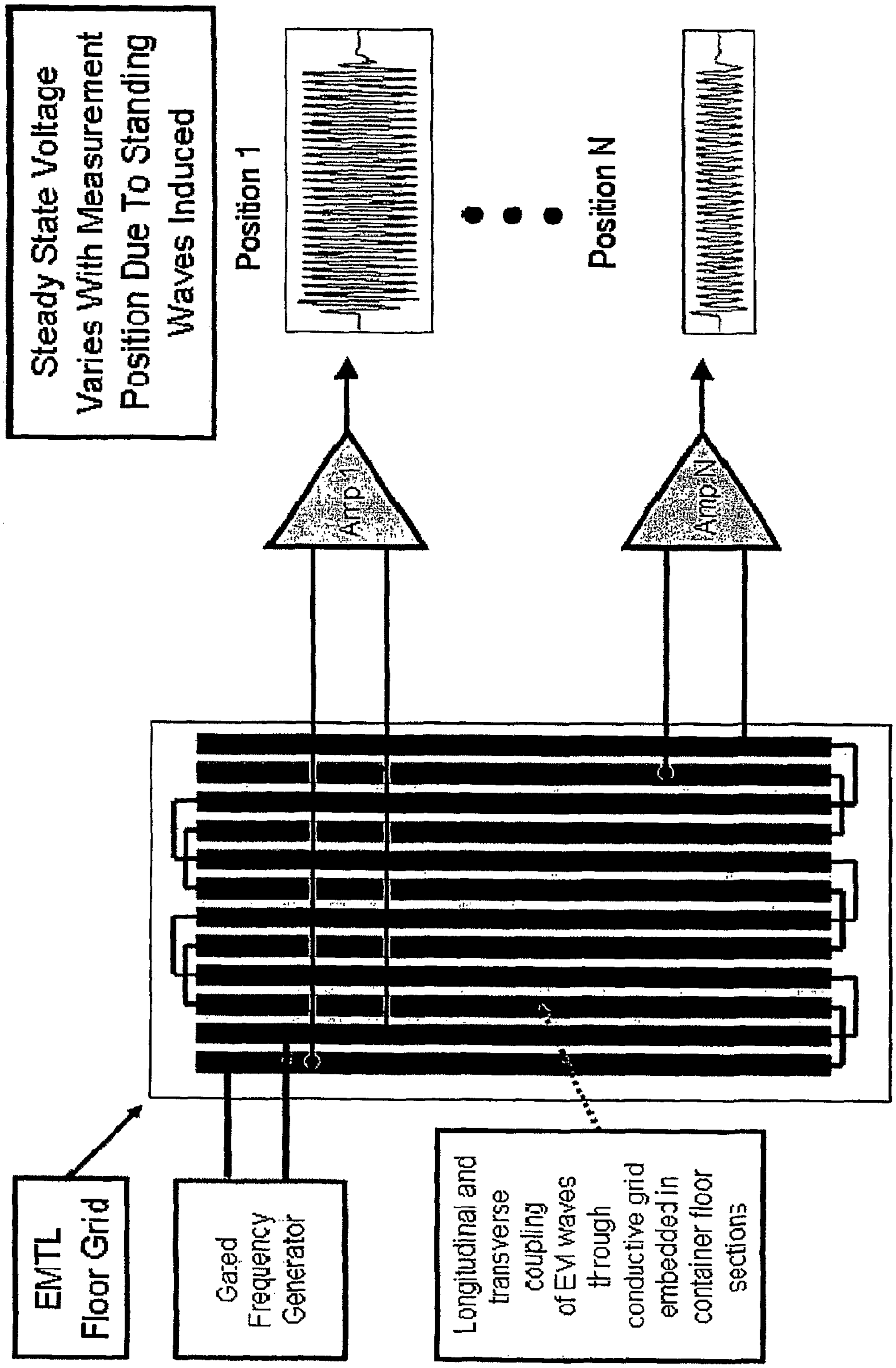
FIG. 7 is a diagram illustrating an electromagnetic transmission line (EMTL) sensor.

The EMTL sensor may comprise a grid of parallel conductive strips that may be installed on container 105's floor sandwiched between two plywood sections to form an electromagnetic transmission line. The spacing of the conductors and the construction of the grid may be such that driving nails through the floor and other damage associated with normal use may not significantly alter (e.g. either by breaking or shorting) the conductors in the grid. However, cutting a hole, for example, with an area greater than nine square inches may break the grid and thus change the transmission line's characteristics. These changes can be detected by measuring the voltage standing wave pattern on the transmission line. A standing wave pattern may be induced on a transmission line when it is driven at a constant frequency and reflections may occur at the transmission line termination. This pattern may be characterized by the location of the maximum and minimum voltage points, the separation between those points, and the ratio of the maximum to minimum voltage values, which is referred to as the VSWR. These transmission characteristics can be measured by sensing the voltage on the transmission line at several locations along the grid at several different frequencies. These frequencies may be applied as short RF bursts in the frequency range from 1 MHz to 50 MHz as shown in FIG. 7. The duty cycle for the signal generation may be approximately 0.001%. Consequently, the time averaged power consumption for this example may be less than 500 μW for a fully instrumented floor in a 40 foot container, for example.

Each EMTL sensor interrogation may use several predetermined frequencies chosen at random from an internal database. Controller 125 may query the peak detectors and compare values with appropriate thresholds for each frequency. When differences are detected that might indicate a potential breach, additional frequencies may be generated to completely characterize the grid. This pattern may be compared to previously stored data to determine if a breach has occurred. A rate of change algorithm may be used to add robustness to this detection process. If the results indicate that a breach has occurred, then an alarm condition may be generated along with a confidence level for that alert. The aforementioned analysis may be performed by controller 125, processor 115, or any element capable of performing this function.

Figure 8:
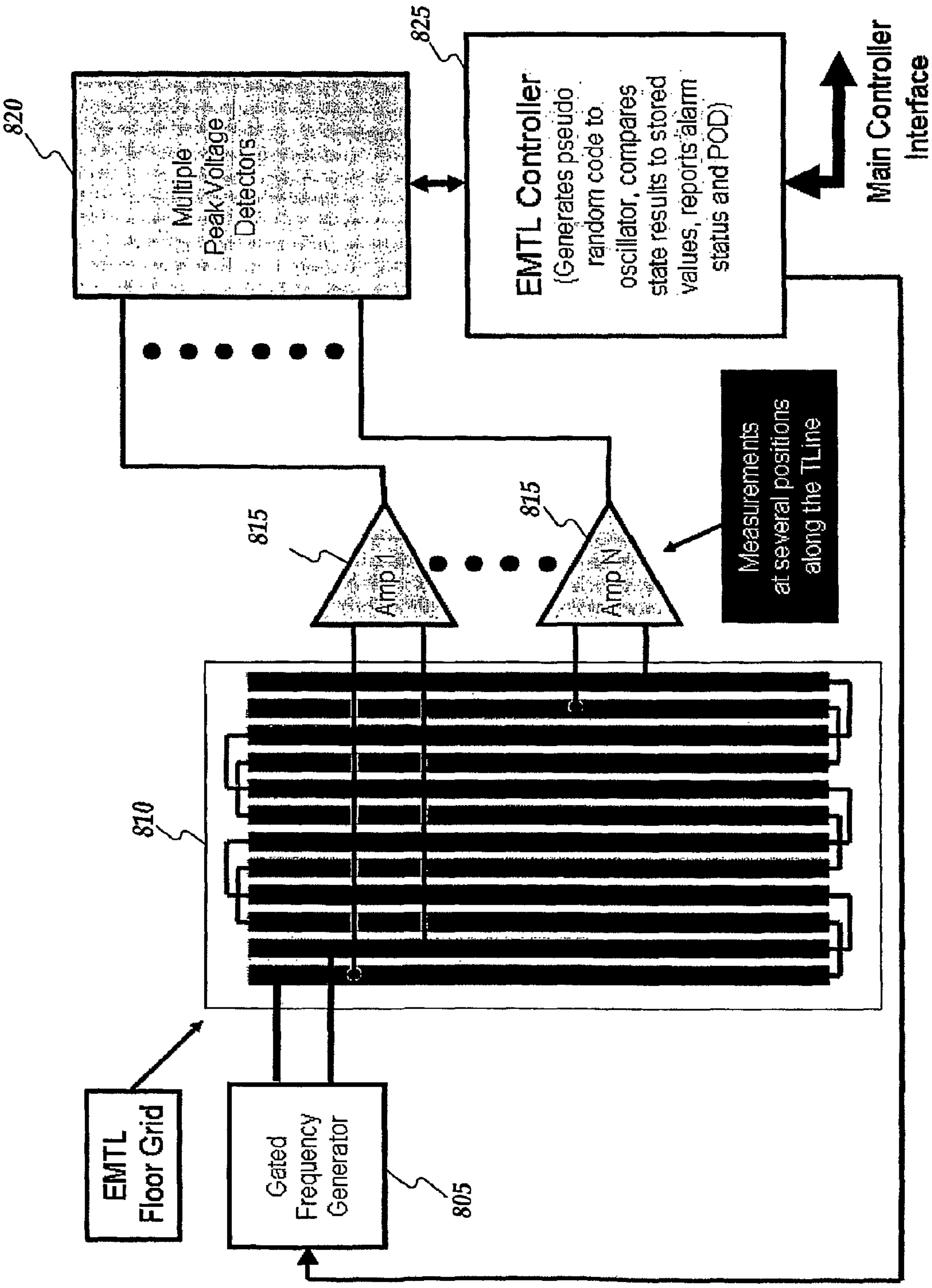
FIG. 8 is a diagram illustrating an electromagnetic transmission line (EMTL) sensor.

The design for the EMTL subsystem is illustrated in FIG. 8. A gated frequency generator 805 may be used to create the RF signals that drive transmission lines in an EMTL grid 810. EMTL grid 810 may comprise parallel conductors (e.g. transmission lines) that may be spaced such that EMTL grid 810 may satisfy, for example, the aforementioned nine square inch breach detection goal while minimizing false alarms. The nine square inch breach detection goal is an example and other goals may be used. Multiple voltage sensing amplifiers 815 with peak detectors 820 may be used to measure the voltage, for example, on EMTL grid 180 at various points of the floor. These measurements may be processed by processor 115, controller 125, or an EMTL controller 825 that may contain memory to store previous grid interrogations.

Figure 9:
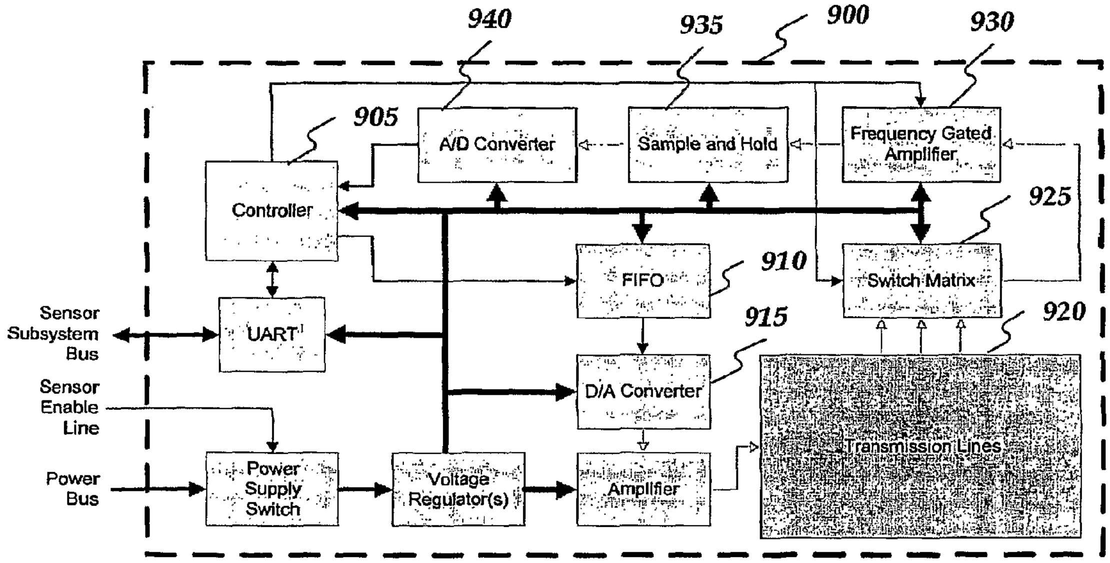
FIG. 9 is a diagram illustrating an EMTL subsystem.

A hardware block diagram that illustrates an example hardware design for an EMTL subsystem 900 is shown in FIG. 9. For example, after each interrogation frequency is selected by controller 905, a short waveform of that frequency may be generated and stored in a FIFO component 910. Once the complete waveform has been stored in FIFO component 910, it may be converted into an analog signal by a digital to analog converter 915 and coupled into a transmission line grid 920. Various points on transmission line grid 920 may be connected to a switching matrix 925 that can cycle through each measurement point. The signal from each selected point may be passed through a frequency gated amplifier 930 that may amplify the signal of interest and blocks out of band noise. A sample and hold circuit 935 may be used to accumulate the output from frequency gated amplifier 930 until the waveform has been completely transmitted. That circuit may be connected to an analog to digital (A/D) converter 940 that may digitize the value of the stored signal from sample and hold circuit 935 and passes it to controller 905. Controller 905 may compare that result to the values from previous measurements at the same frequency to determine whether a breach has occurred.

Container Movement Detection

Consistent with embodiments of the invention, the detection of any movement of container 105, whether the movement is, for example, via rail, ship, or truck, may be achieved by continuously monitoring the horizontal speed of container 105. For example, processor 115 or controller 125 may record changes in container 105's movement status where a threshold speed (e.g. 1 mi/hr) may determine if container 105 is moving or not.

Speed may be measured, for example, by making surrogate measurements of either distance or acceleration and then differentiating or integrating, respectively, those values relative to time. For example, acceleration values may be used to calculate speed. Two accelerometers may be oriented such that their axes of detection are orthogonal to each other and horizontal to the ground. The two measured acceleration components may be integrated with respect to time and the resulting velocity components may be root-sum-squared to obtain the speed. Accelerometers used, for example, may have a measurement range of ±2 g and frequency bandwidths of 50-60 Hz. Consistent with embodiments of the invention, where power consumption may be critical, surface micromachined capacitive accelerometers may provide the lowest power consumption while satisfying any measurement requirements.

Velocity sensors based on accelerometers may suffer from velocity drift errors, the magnitude of which may increase over time. This drift may be caused by zero-g bias errors that may be temperature dependent. The amount of error may vary from one accelerometer to another. Consequently, accelerometers used for inertial navigation may be used as temporary backups to some other more accurate sensors such as those that use the global positioning system (GPS) that may be less prone to measurement drop-outs. In applications where the accelerometer may be the primary sensor, another sensor input may be used to periodically correct the measured value (e.g. by making distance measurements to the surroundings or by motion-tracking of objects in video images). Embodiments of the invention may not use sensors external to container 105, so correction of any temperature-dependent errors may be accomplished by sensing the accelerometer's temperature and correcting the measured signal in software. On short time scales, velocity errors from noise sources and cross-coupling of acceleration components may be corrected with very-low frequency digital filtering.

Figure 10:
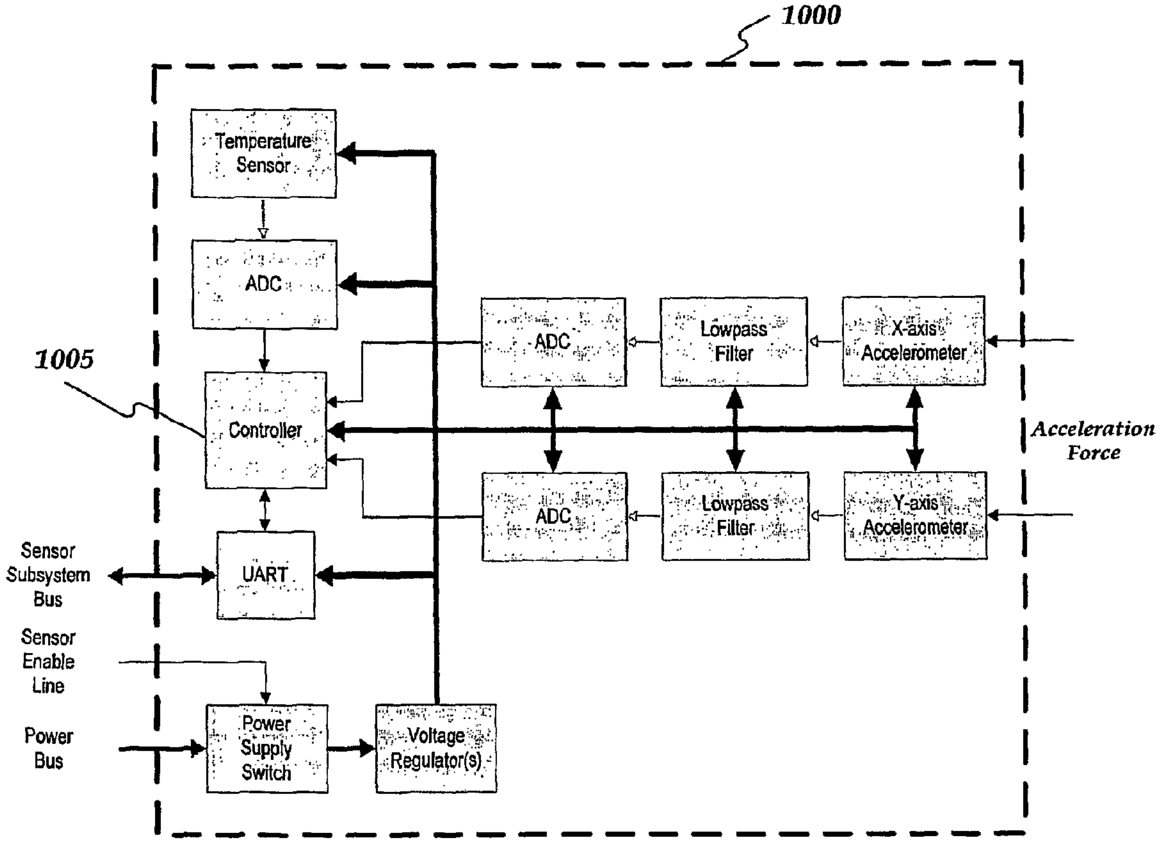
FIG. 10 is a diagram illustrating a container movement detection subsystem.
Figure 11:
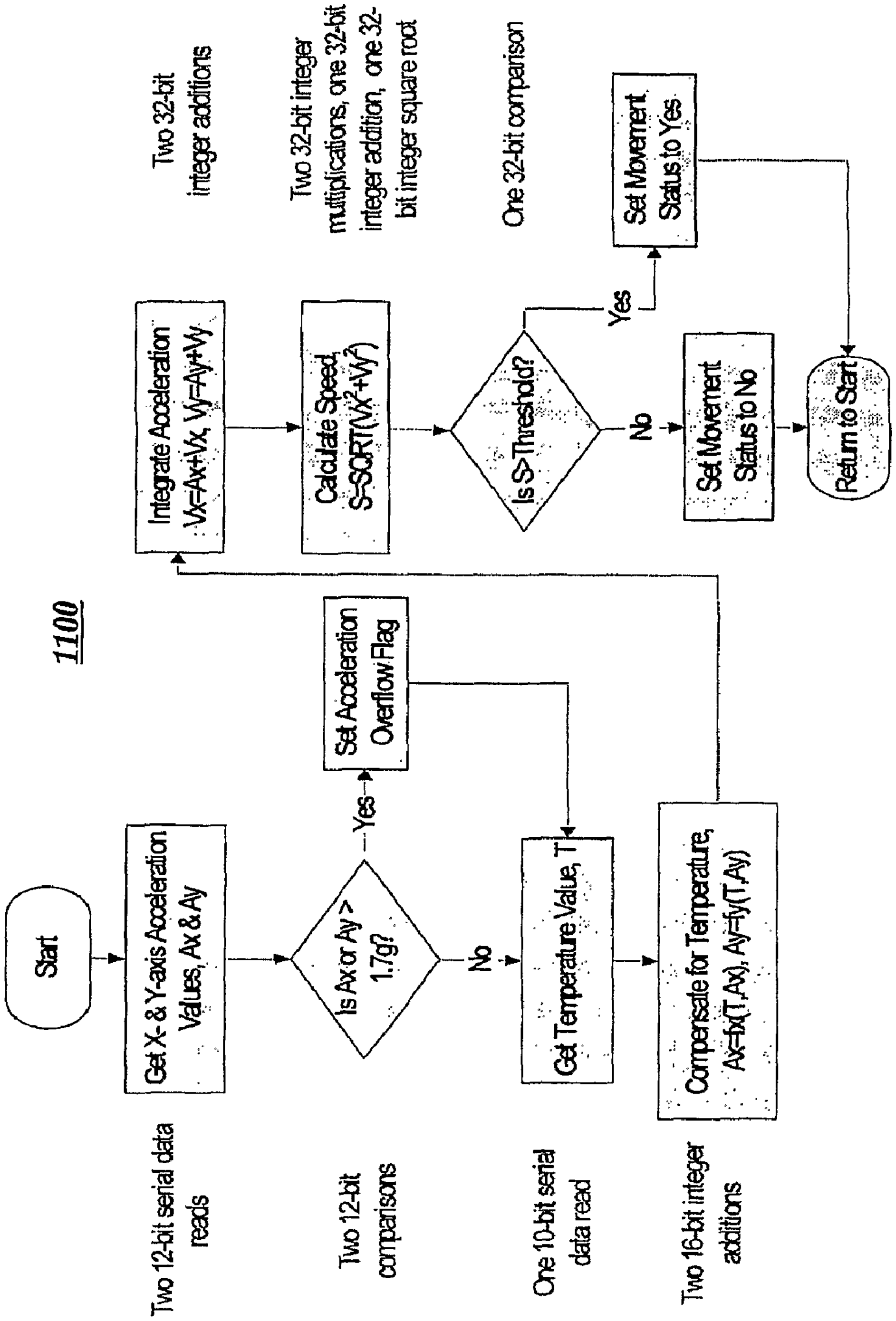
FIG. 11 is a flow chart of a method for container movement detection.

A block diagram of a container movement detection subsystem 1000 is shown in FIG. 10. Controller 1005 for the subsystem may be responsible for the timing of the acceleration and temperature measurements as well as the calculation of the zero-g offset error correction and speed. FIG. 11 is a flowchart of a method 1100 for container movement detection that may be performed in software executed, for example, on processor 115 or, controller 125, or both. Method 1100 is an example and other processes may be used.

Human Detection

The detection of animal or human presence inside container 105 may be achieved by monitoring $CO_2$'s concentration rate of change for container 105's interior atmosphere. Measurements of $CO_2$ concentration may be performed by system 100 every 10 minutes. If the $CO_2$ concentration increases such that over the course of two hours, for example, a threshold rate of change is exceeded, system 100 may initiate a human detection event alert. The rate of change threshold may comprise, for example, 3.3%/min and 1.6% /min for 20' and 40' containers respectively.

Figure 12:
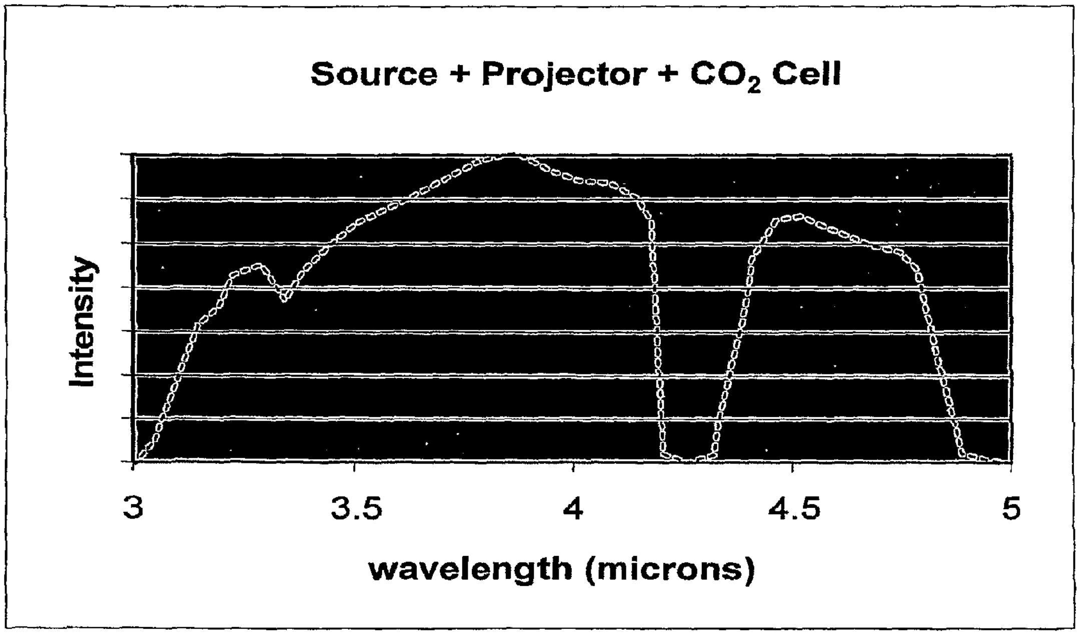
FIG. 12 is a diagram illustrating infrared radiation absorption.

Consistent with embodiments of the present invention, processes used for measuring $CO_2$ concentration may be based upon a non-dispersive infrared (NDIR) process of gas detection. In the NDIR process, IR light from a broadband source, such as a heated filament, may be passed through a sample of the gas mixture to be analyzed, and detected with two separate photodetectors. Any $CO_2$ molecules within the gas mixture may absorb IR radiation having wavelengths between 4.18 and 4.33 μm as shown by the graph in FIG. 12. The amount of radiation absorbed may be dependent on the concentration of $CO_2$ within the gas mixture and the optical path length of the light as it passes through the gas sample and arrives at either of the photodetectors. Distinct bandpass optical filters may be used with each photodetector to isolate different portions of the transmitted light's spectrum. The passband of one filter may be confined to the $CO_2$ absorption band mentioned above while the other filter's passband may be centered at 3.6 μm. Because $CO_2$ may not absorb energy at this second wavelength, this photodetector's response may be used as a witness value to gauge the ambient optical transmission of the gas mixture. A ratio of the two photodetectors' electrical responses may then be directly related to the $CO_2$ concentration of the gas mixture and independent of the transmission of the gas mixture.

Figure 13:
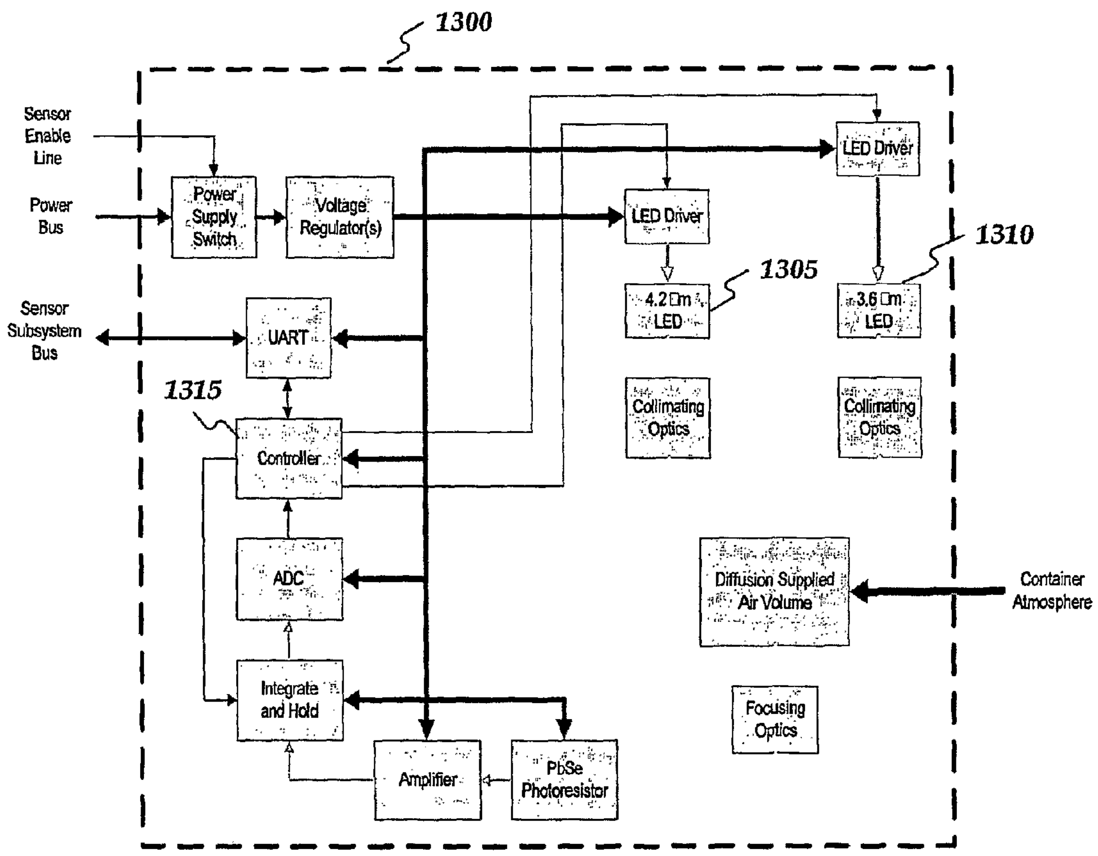
FIG. 13 is a diagram illustrating a human detection subsystem.

Instead of one broadband IR source and two filtered photodetectors, embodiments of the invention may include a human detection subsystem 1300 that may use two mid-wave IR (MWIR) LED sources and one unfiltered photodetector to detect the transmitted light as shown in FIG. 13. A MWIR LED 1305 may emit at 4.2 μm and another MWIR LED 1310 may emit at 3.6 μm with the photodetector having sufficient sensitivity at both of these wavelengths. Again, a ratio of the photodetector's response to the transmitted 4.2 μm radiation to the response at 3.6 μm may be directly related to the gas mixture's $CO_2$ concentration. One benefit to this process for $CO_2$ detection over the aforementioned process described above is that the average power consumption may be reduced. For example, MWIR LEDs 1305 and 1310 may be briefly pulsed once during each measurement period as opposed to the heated filament source that may require a warm-up time lasting on the order of several seconds. Another benefit of this approach may be that the operating temperature range may be much wider than the above mentioned process.

Figure 14:
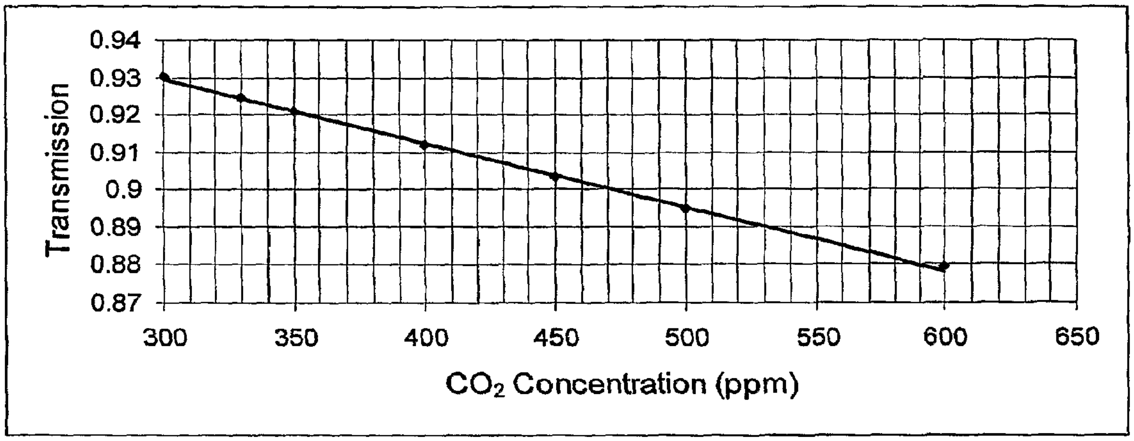
FIG. 14 is a graph illustrating a calculated 10 cm path transmission for 4.3 μm $CO_2$ absorption band.

FIG. 14 shows a calculated 10 cm path transmission for 4.3 μm $CO_2$ absorption band. The optical path length separating the LEDs from the photodetector may be 10 cm. For this path length, the transmission at the 4.3 μm absorption band may vary linearly with $CO_2$ concentration as shown in FIG. 14. A 50 ppm increase in $CO_2$ may result in a 1% decrease in transmission that may require a 20 dB SNR to detect.

Figure 15:
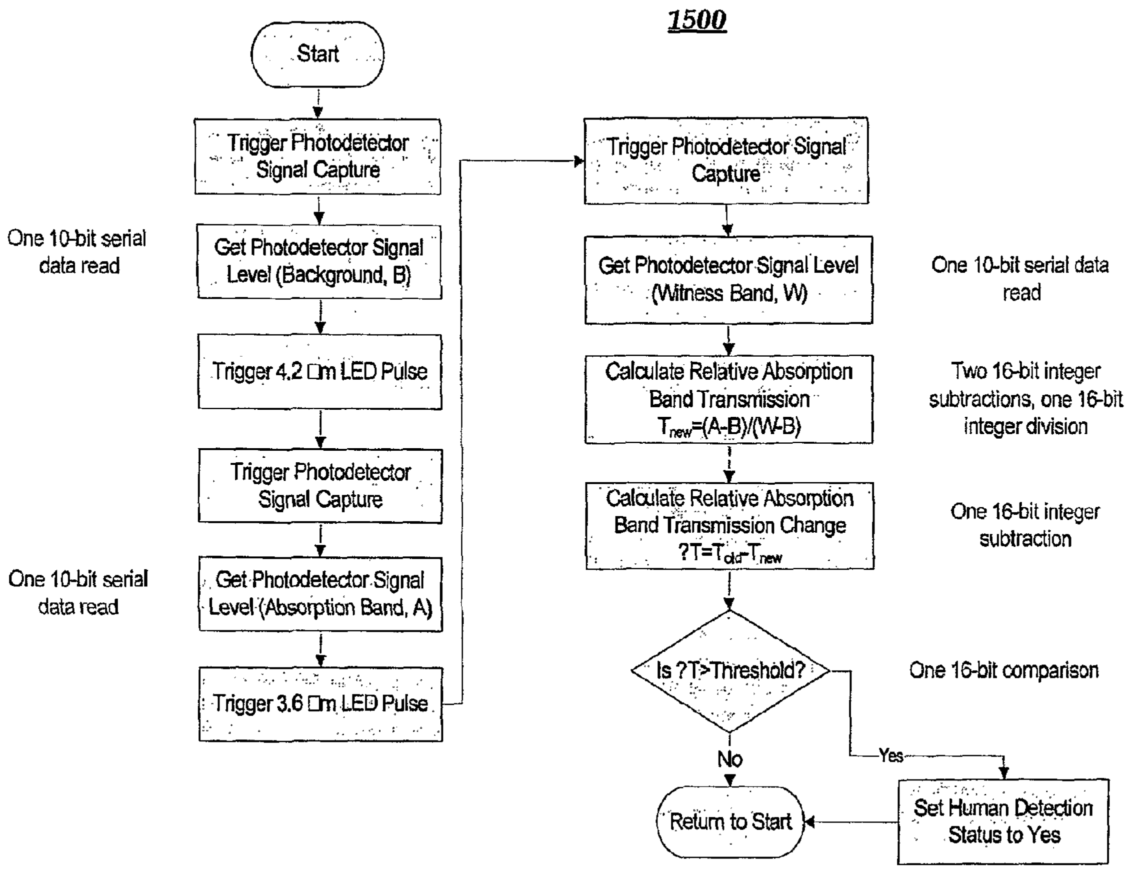
FIG. 15 is a flowchart of a method for detecting humans in an enclosure.

A controller 1315 for human detection subsystem 1300 may be responsible for timing both the LED pulse events and the digitization of the photodetector response signals as well as calculating the $CO_2$ concentration. A flowchart of a method 1500 for operating human detection subsystem 1300 is shown in FIG. 15. Method 1500 may be implemented in software, for example, by controller 125 or processor 115, however, other methods may be used. In addition to measuring the photodetector response to the LED pulse events, the response to the background light level preceding the LED pulse events may be measured in order to remove the background signal value from both of the pulse event signal values during the calculation of the $CO_2$ absorption band transmission.

Door Status Detection

Figure 16:
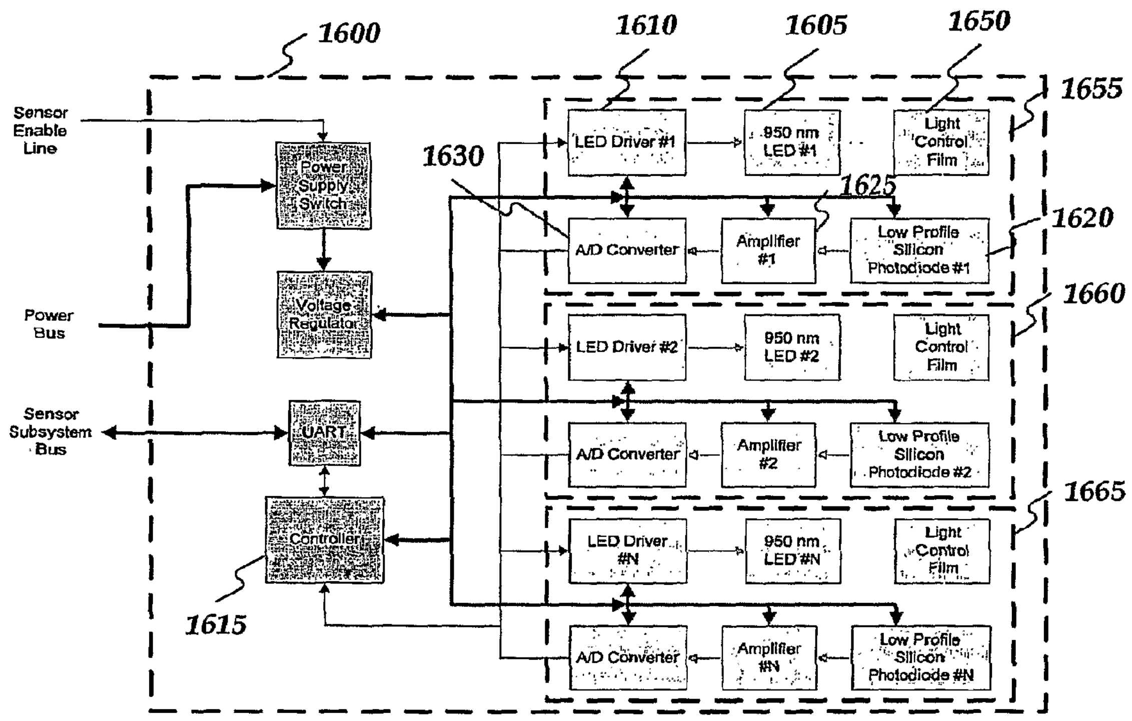
FIG. 16 is a diagram illustrating a door status subsystem.

Consistent with embodiments of the invention, an optical sensor may be provided on a door within a door status subsystem 1600 as shown in FIG. 16. Door status subsystem 1600 may be used to detect door status on container 105. An optical approach may provide several advantages, including very low power consumption, high detection probability, and resistance to tampering, for example. A door sensor may comprise two components that may be mounted at the door-container interface. One component may be mounted on the container 105's door. This component may include a low divergence LED transmitter 1605 operating at a wavelength of 950 nm along with a driver circuit 1610 for the LED. A subsystem controller 1615, which may be connected to the transmitter by a cable that runs down the door, may generate a digital pulse whenever the transmitter is supposed to be activated. After receiving a pulse from controller 1615, driver circuit 1610 may supply a single current pulse to LED 1605 that may be one microsecond in duration and 100 milliamps in amplitude. The duration and amplitude of this signal may be adjusted via small changes to the design of driver circuit 1610. Because LED 1605/driver circuit 1610 combination may be capable of transmitting short pulses at relatively high frequencies, subsystem controller 1615 may generate randomly varying pulse codes that may make it difficult for a false source to be substituted to allow the door to open without detection.

Figure 17:
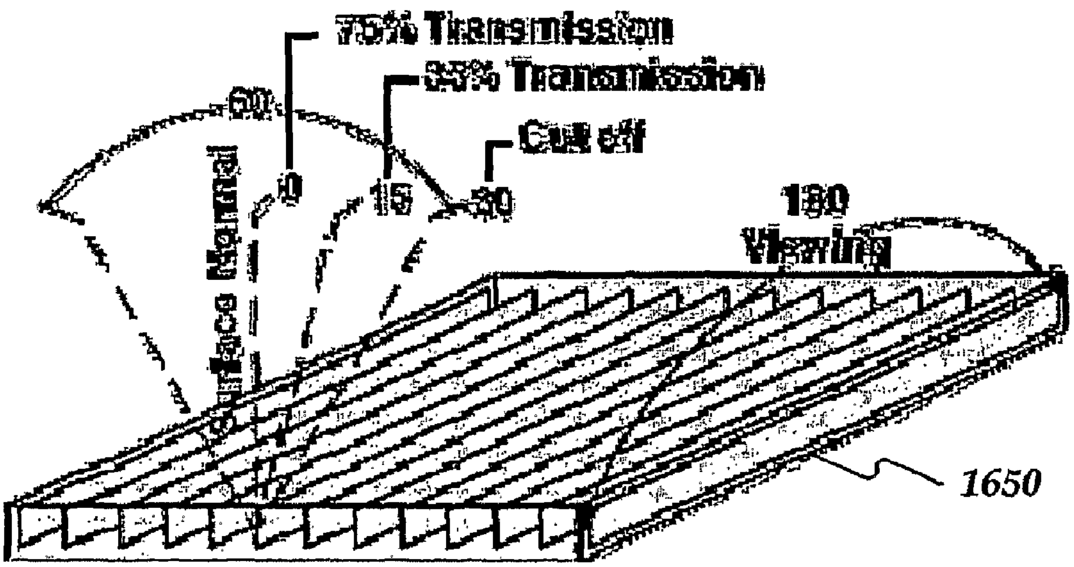
FIG. 17 is a diagram illustrating a light control film coating.

A second component may be mounted on container 105's wall. The second component may include a low profile silicon photodiode 1620 that may be sensitive to LED 1605's wavelength. When the door is in the closed position, the light from the transmitter (i.e. first component) may be incident upon the detector (i.e. second component). As the door opens, the angle of incidence between the transmitter and the receiver may increase proportionally to the increase in angle between the door and the door interface. This change in angle may be exploited through using a light control film coating 1650 on the receiver as shown in more detail in FIG. 17. Light control film 1650 may comprise two thin plastic sheets that sandwich small vertical louvers between them.

Light control film 1650 may cause the output of photodiode 1620 to become strongly dependent upon the angle of incidence between the transmitter and the receiver. As a result, the receiver output may decrease rapidly as the door is opened and the angle between the transmitter and receiver increases. This change in receiver output can be measured electronically and compared to a stored threshold value to determine whether the door has been opened. The threshold value, for example, may be based on a 44 mm opening that may be allowed due to container racking. A 44 mm opening may translate into a two degree angle between the door and the container interface. A two degree change in angle of incidence may result in a change in receiver output of approximately 5%, which may be in the detectable range for this sensor. The use of a threshold value may allow for simple adjustments if operational experience indicates that 44 mm is not an accurate deviation due to container racking. Moreover, the angular dependence may occur only in one direction, which may reduce the alignment requirements for the installed sensors. In order to compare the receiver output with the threshold value, it may be first amplified by an amplifier 1625 and then converted into a digital signal using an analog to digital converter 1630. A/D converter 1630 may be connected directly to controller 1615 that may perform the processing.

Consistent with embodiments of the invention, in order to minimize the effects of container racking, the sensors may be installed at the same location as the door hinges since the hinge may limit movement of the door. Multiple sensors (e.g. three sensors 1655, 1660, and 1665) may be used on each door in order to provide redundancy in the event of accidental or malicious failures. Although some containers may use more than three hinges, additional sensors may not provide sufficient improvements in probability of detection or false alarm to justify the additional cost. The cables that connect each sensor component to subsystem controller 1615 may carry both power and digital signals to and from sensors 1655, 1660, and 1665. These cables may be part of a main wiring harness in order to minimize installation complexity. Armored cable may be used to reduce the risk of either accidental or intentional damage to the cable. Routing the cable in container 105's corrugations where possible may also limit the impact of the cable on the container.

In order to minimize installation complexity, the two sensor components may be manufactured as one physical part with a perforated plastic material separating the two sensors. Once the sensors have been secured to the container, the plastic holding the two parts together may be cut and removed, allowing the door to move freely. This construction may ensure that the sensors are properly aligned during installation. Packaging for the sensor may be rugged but unobtrusive in order to avoid impacting container operations. Both components may be packaged in small metal housings that are sturdy enough to withstand impacts from cargo shifting in the container. The LED diameter may be 5 mm and the thickness of the photodiode may be less than 1 mm. This may allow each component to be low profile. This construction, along with the curved nature of the housings, may reduce the risk of cargo or loading equipment accidentally removing the sensors from the wall.

Figure 18:
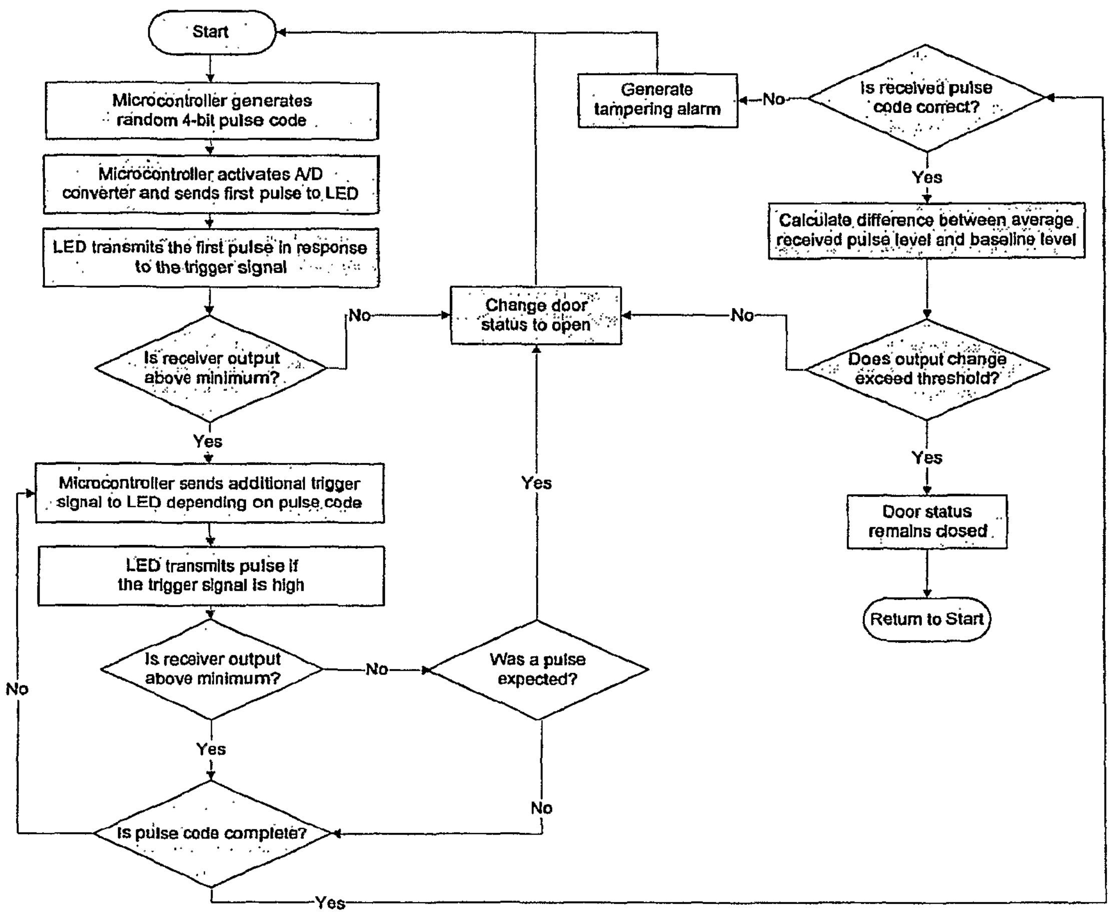
FIG. 18 is a flow chart of a method for operating a door status sensor.

As shown in FIG. 18, method 1800 may describe a process for operating the door status sensors. In order to prevent the introduction of a false transmitter, a randomly generated pulse code may be used for each interrogation of the sensor. This pulse code may comprise four bits during which the transmitter can either be on or off, resulting in sixteen different combinations. A start pulse may be used to indicate the beginning of a new interrogation in addition to the four bits of the pulse code. After the start pulse is transmitted, the receiver output may be amplified and converted into a digital value by an A/D converter. If this output does not exceed the minimum threshold value, then the door status may be changed to open and transmitted to controller 125. If it is above the minimum, then the remainder of the pulse code is transmitted. Each bit may be compared to the threshold level to determine whether the transmitted bit was on or off. After the pulse code has been completely transmitted, the received pulse code may be compared to the expected pulse code in subsystem controller 1615 to determine whether the correct code has been received. If the correct code has not been received, then a tampering alarm may be generated to indicate that an attempt to defeat the system has occurred. A door open status may only be declared if all three sensors on a given door indicate that it is open. This may provide further immunity to container racking errors. These pulse codes may be generated in a pseudorandom manner so that the receiver knows what code to expect from the transmitter at any particular moment. This may eliminate the need to connect a cable between the transmitter located on the door and the receiver located on the container wall.

Consistent with embodiments of the invention, a pseudo-random number generation (PRNG) modulation scheme may be used to eliminate the need for a cable connecting the transmitter and receiver component and also to prevent tampering via the introduction of an external LED source. PRNG may utilize a pseudo-random sequence that may be seeded at the factory and known only to the transmitter and receiver and may allow the receiver to know what code is expected at a particular time without a wired connection to the transmitter. The transmitter unit may generate a large-length pseudo-random bit sequence using a linear feedback shift register that may include randomly interleaved re-sync events. These re-sync events may appear to be a continuation of the random bit stream normally generated, but may be recognized by the receiver and may permit the receiver to synchronize with the transmitted bit stream without needing to exhaustively test all possible bit sequences. The average rate of re-sync events may be controlled by design.

Sensor Fusion

Figure 19:
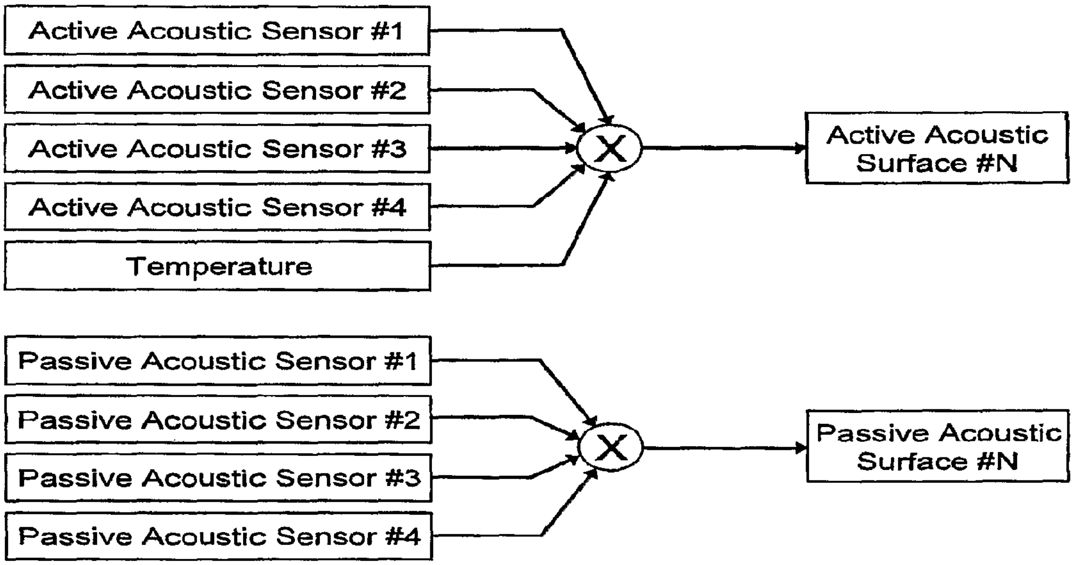
FIG. 19 is a diagram illustrating sensor fusion.
Figure 20:
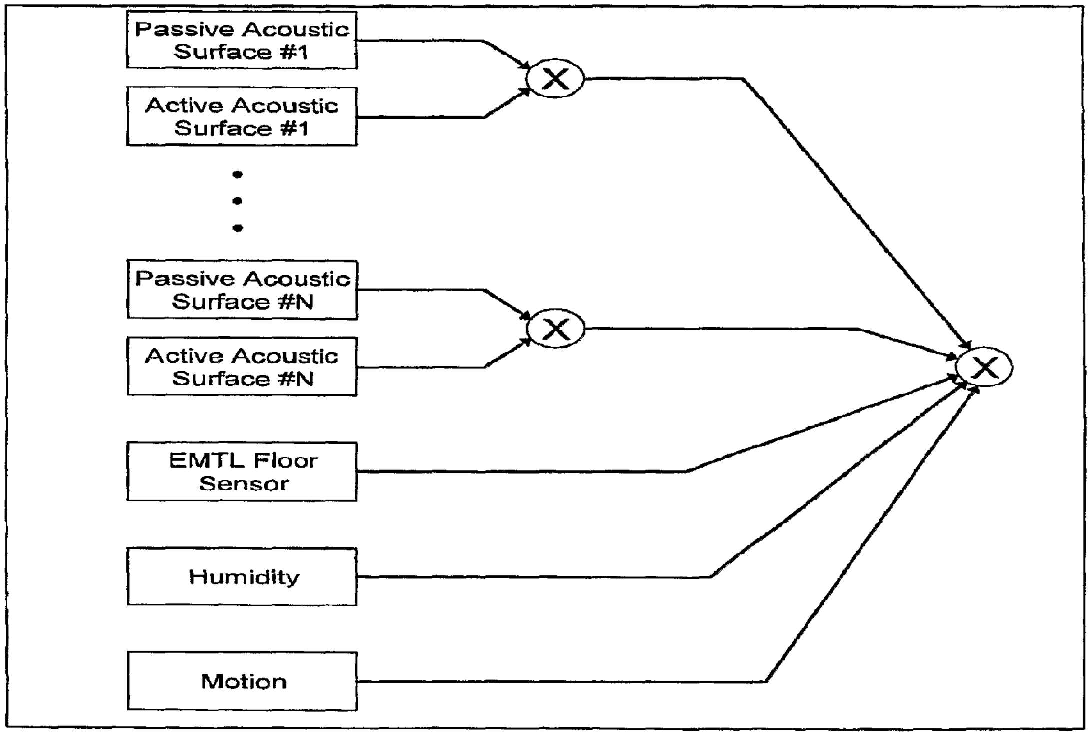
FIG. 20 is a diagram illustrating sensor fusion.

Consistent with embodiments of the invention, ultrasonic sensor data may be fused at multiple (e.g. three) levels as shown in FIG. 19 and FIG. 20. First, at the sensor level, active sensors may be fused with temperature sensor data to obtain an active sensor result for each container surface (e.g. walls, ceiling, doors). Similarly, passive sensor data may be fused to obtain a passive result for each surface. Second, at the surface level, active and passive results may be fused. Finally, at the container level, active and passive ultrasonic sensor data from each surface may be fused with EMTL sensor results along with humidity and motion sensor information to obtain an overall container breach result. This fusion hierarchy is shown in FIG. 19 and FIG. 20 below where the circle with an "X" indicates fusion. The actual fusion algorithms may use simple voting strategies or complex neural networks for example.

Tampering Resistance

Consistent with embodiments of the invention, tamper resistant mechanisms may be incorporated into each of the sensor subsystems. For example, the door status sensor may use a randomly generated optical code to prevent the introduction of a false transmitter to simulate the door closed signal. Other subsystems, including the ultrasonic and EMTL sensors, may use time-varying signals that may be difficult to spoof. Furthermore, cabling may contain an internal continuity loop that can be interrogated to ensure that the cable is still connected properly. This may provide an early alert if an attempt to cut a cable occurs.

System batteries may be installed in controller 125 to prevent removal by unauthorized persons. Power to the system may be activated via an irreversible switch mechanism that may prevent the system from being turned off without accessing a secure enclosure housing controller 125. Moreover, all circuit boards may either be conformal coated or embedded in potting compound for protection from environmental conditions (e.g. intentional or otherwise) and resistance to exploitation and tampering.

Controller 125 may be environmentally sealed using a bladder process to prevent problems due to gases or moisture. Furthermore, controller 125 may be mounted to container 105 using a base plate fabricated from ballistic aluminum or a similar material that may be difficult to breach without specialized tools. The integrity of controller 125's mounting may be monitored using a sensor similar to those used to detect door status and any breach attempts may be reported as alerts.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as show in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for determining a structure intrusion, the method comprising:

receiving, in a passive detection mode, a signal corresponding to an elastic wave propagating in the structure;

analyzing, by a processing device, the received signal;

determining that at least one aspect of the received signal crosses a predetermined threshold; and switching from the passive detection mode to an active detection mode in response to a determination that at least one aspect of the received signal crosses the predetermined threshold, wherein switching from the passive detection mode to the active detection mode comprises switching from independent sensor operation to transmit-receive paired sensor operation.

2. The method of claim 1, wherein receiving the signal corresponding to the wave propagating in the structure comprises receiving the signal that interacted with at least one of the following: boundaries of the structure and variations of the structure.

3. The method of claim 1, wherein receiving the signal corresponding to the wave comprises receiving the signal corresponding to the wave comprising one of the following: the wave being an elastic wave in an acoustic frequency range and the wave being an elastic wave in an ultrasonic frequency range.

4. The method of claim 1, wherein analyzing the received signal comprises analyzing the received signal in a frequency domain.

5. The method of claim 1, wherein analyzing the received signal comprises analyzing the received signal in a frequency domain in terms of ratios of energies in different frequency bands.

6. The method of claim 1, wherein analyzing the received signal comprises analyzing the received signal in a time domain.

7. The method of claim 1, wherein analyzing the received signal comprises analyzing the received signal in a time-frequency domain.

8. A method for determining a structure intrusion, the method comprising:

receiving, at a first state independent sensor operation mode, a first signal corresponding to a first wave propagating in the structure;

analyzing the received first signal;

determining that at least one aspect of the received first signal crosses a predetermined threshold;

switching, in response to a determination that the at least one aspect of the received first signal crosses the predetermined threshold, to a transmit-receive paired sensor operation mode second state;

receiving, at the paired sensor operation mode second state, a second signal corresponding to a second wave propagating in the structure;

analyzing, by a processor device, the received second signal; and determining, in response to analyzing the received second signal, that a breach has occurred in the structure.

* * * * *